June 2, 1964  L. F. EVE  3,135,521
FEED FINGERS
Filed Dec. 26, 1961
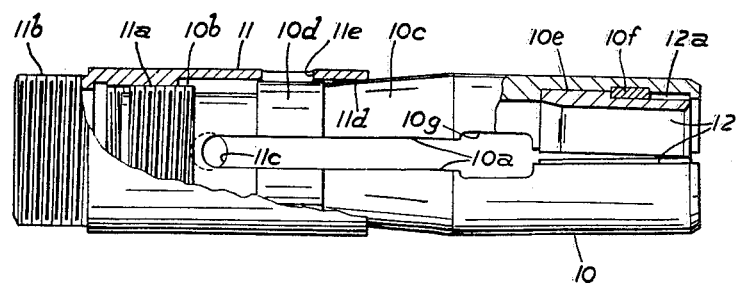
INVENTOR
LEONARD FRANK EVE
BY
Mason, Mason & Albright
ATTORNEYS

United States Patent Office 3,135,521
Patented June 2, 1964

3,135,521
FEED FINGERS
Leonard F. Eve, Burford, England, assignor to Crawford Collets Limited, Witney, England, a company of Great Britain
Filed Dec. 26, 1961, Ser. No. 161,922
Claims priority, application Great Britain Dec. 30, 1960
5 Claims. (Cl. 279—46)

This invention relates to feed fingers of the kind which are used for advancing stock in machine tools.

According to the present invention there is provided an adjustable feed finger comprising a barrel formed to provide a plurality of resilient fingers and a screw adaptor, said screw adaptor having an internal screw thread for screw-threaded engagement with an external screw-thread on said barrel, the arrangement being such that the grip of the feed finger can be varied by relative rotation of said barrel and said screw adaptor, said adaptor also having an external screw-thread for screw-threaded engagement with a stock feeding member.

The invention also provides an adjustable feed finger comprising a barrel having resilient fingers joined to an externally screw-threaded portion, and a screw adaptor having an internal screw-thread adapted to receive said externally screw-threaded portion, relatively-inclined surfaces of said barrel and said screw adaptor being engageable and movable relatively to one another by rotation of said screw adaptor relative to said barrel, said screw adaptor having an externally screw-threaded portion of approximately the same diameter as the maximum diameter of said barrel for screw-threaded engagement with a stock feeding member.

One form of feed finger in accordance with the present invention will now be described, by way of example only, with reference to the accompanying drawing which is a part sectional side elevation of the feed finger.

This form of feed finger is of the adjustable kind in which the separation between the fingers can be adjusted over a limited range to vary the tension or grip on the stock, thereby overcoming the prevalent trouble of slip between the feed finger and the stock, which results in the stock being advanced insufficiently. Such slip may be due to wear which results in loss of tension. The feed finger comprises a barrel 10 having two diametrically opposite slits 10a extending for the major part of the length of the barrel 10 to form the resilient fingers. The end portion into which the slits 10a do not extend is provided with an external screw thread 10b which engages with the internal screw thread 11a of an externally fitting screw adaptor 11. The outer surface of the barrel is of constant cross-section for nearly half its length and then tapers at 10c to an intermediate diameter portion 10d which is joined by a smaller diameter portion to the threaded end portion 10b which is of approximately the same diameter as the intermediate diameter portion 10d.

The screw adaptor 11 has an external screw thread 11b by which it can be screwed to the stock feeding member (not shown) of the machine tool so that the stock feeding member can effect reciprocation of the feed finger for advancing the stock.

In contrast to existing adjustable feed fingers, the screw thread adapted for screw-threaded engagement with the stock feeding member, which in accordance with the invention is provided by the external screw thread 11b of the screw adaptor, has a diameter almost as large as the maximum diameter of the barrel 10. The mouth 11d of the screw adaptor is tapered at a small angle, for example of four degrees, somewhat less than the angle of the tapered barrel portion 10c. When the threaded end portion 10b of the barrel 10 is screwed into the screw adaptor 11 the tapered mouth 11d of the adaptor sleeve 11 engages the tapered portion 10c of the barrel 10 so that by relative rotation of the screw adaptor 11 and the barrel 10 the tension of the fingers on the stock can be varied. The tension of the fingers is sufficient to lock the screw adaptor 11 in its set position.

The periphery of the screw adaptor is provided with one or more holes 11c for engagement by a tool such as a C spanner, so that by engaging another tool in the enlarged portion 10g of a slit 10a the barrel and the screw adaptor can be rotated relative to one another for adjustments. Numbers (not shown) stamped on the intermediate diameter portion 10d are visible sequentially through a hole 11e in the screw adaptor. These numbers may not represent definite tensions but are useful in re-setting the feed finger after the best working conditions have been found.

In the case of master feed fingers replaceable semi-circular pads 12 are provided within the fingers, which are recessed at 10e to locate the pads 12, each finger having a key 10f fitting in a keyway 12a in the respective pad 12 to prevent rotation. It will be understood that with master feed fingers a number of sets of pads of different dimensions can be provided, so that by interchanging the pads the feed fingers can be used with stock of various diameters. Also pads made of different materials can be used, so that the pads used at any given time may be of an appropriate material for the stock which is to be fed, in order to avoid pick-up or marking of the stock.

The invention is not limited to master feed fingers having replaceable pads but is equally applicable to feed fingers of the solid type.

What I claim is:

1. An adjustable feed finger for attachment to a stock feeding member comprising a barrel having an external screw thread, said barrel being slit to provide a plurality of resilient fingers, and a screw adaptor, said screw adaptor having an internal screw thread for screw-threaded engagement with the external screw thread on said barrel, said barrel and said screw adaptor having opposed inclined surfaces whereby the grip of the feed finger can be varied by relative rotation of said barrel and said screw adaptor, said screw adaptor also having an external screw thread for screw-threaded engagement with the stock feeding member.

2. A feed finger according to claim 1, wherein the external screw thread of said screw adaptor is of substantially the same diameter as the maximum diameter of said barrel.

3. An adjustable feed finger comprising a barrel having resilient fingers united to an externally screw-threaded portion, and a screw adaptor having an internal screw thread adapted to receive said externally screw-threaded portion, said barrel and said screw adaptor having respective relatively inclined surfaces engageable and movable relatively to one another by rotation of said screw adaptor relative to said barrel, said screw adaptor having an externally screw-threaded portion of approximately the same diameter as the maximum diameter of said barrel for screw-threaded engagement with a stock feeding member.

4. A feed finger according to claim 3, wherein said barrel has marks thereon and said screw adaptor has an index thereby facilitating resetting of the feed finger to a predetermined tension.

5. A feed finger according to claim 3, wherein said screw adaptor has a hole therein and said barrel has marks thereon, said marks being visible sequentially through the hole as the barrel and screw adaptor are rotated relatively to one another.

References Cited in the file of this patent
UNITED STATES PATENTS

| | | |
|---|---|---|
| 2,159,388 | Klute | May 23, 1937 |
| 2,680,623 | Hasselblad | June 8, 1954 |
| 2,872,199 | Cox | Feb. 3, 1959 |